US009410518B2

(12) United States Patent
Geyer et al.

(10) Patent No.: US 9,410,518 B2
(45) Date of Patent: Aug. 9, 2016

(54) TAPPET

(71) Applicant: Schaeffler Technologies AG & Co. KG, Herzogenaurach (DE)

(72) Inventors: Norbert Geyer, Hochstadt (DE); Stefan Dorn, Hollfeld (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/763,688

(22) PCT Filed: Nov. 18, 2013

(86) PCT No.: PCT/DE2013/200304
§ 371 (c)(1),
(2) Date: Jul. 27, 2015

(87) PCT Pub. No.: WO2014/117762
PCT Pub. Date: Aug. 7, 2014

(65) Prior Publication Data

US 2015/0361937 A1 Dec. 17, 2015

(30) Foreign Application Priority Data

Jan. 29, 2013 (DE) ......................... 10 2013 201 335

(51) Int. Cl.
*F16H 53/06* (2006.01)
*F01L 1/14* (2006.01)
*F02M 59/10* (2006.01)
*F04B 1/04* (2006.01)

(52) U.S. Cl.
CPC ............ *F02M 59/102* (2013.01); *F04B 1/0408* (2013.01); *F04B 1/0426* (2013.01); *F04B 1/0435* (2013.01); *F04B 1/0439* (2013.01)

(58) Field of Classification Search
CPC ... F02M 59/102; F04B 1/0408; F04B 1/0426; F04B 1/0435; F04B 1/0439; F01L 1/14; F01L 1/143; F01L 2001/187; Y10T 74/2107
See application file for complete search history.

(56) References Cited

U.S. PATENT DOCUMENTS

| | | | | |
|---|---|---|---|---|
| 7,793,583 B2 * | 9/2010 | Radinger | ................ | F01L 1/143 74/569 |
| 8,201,532 B2 * | 6/2012 | Prokop | ..................... | F01L 1/14 123/90.5 |
| 8,522,739 B2 * | 9/2013 | Pflugl | ....................... | F01L 1/14 123/90.48 |

(Continued)

FOREIGN PATENT DOCUMENTS

| | | | |
|---|---|---|---|
| DE | 102012211113 | 1/2014 | |
| DE | 102012211529 A1 * | 1/2014 | ................ F01L 1/14 |
| WO | 2008068116 | 6/2008 | |

*Primary Examiner* — Adam D Rogers
(74) *Attorney, Agent, or Firm* — Volpe and Koenig, P.C.

(57) ABSTRACT

A tappet including a housing having a drive-side annular end face at which two flat sections, recessed in relation to an outer shell of the housing, lie diametrically opposite one another, and a bolt supporting a roller mounted in said sections is provided. A bridge section protrudes through an inner shell of the housing, and the output-side end face of said bridge section acts as a contact point for a tappet follower part, the bridge section lying against undersides of said flat sections and being held by a ring that is arranged in the inner shell, and sits in a groove of the inner shell so as not to protrude radially out of said groove, at least two tabs projecting radially inwards from an upper side of the ring, and the bridge section fixed thereupon in the direction of the output-side annular end face.

8 Claims, 3 Drawing Sheets

(56) References Cited

U.S. PATENT DOCUMENTS

2008/0190237 A1 8/2008 Radinger
2013/0213181 A1* 8/2013 Dorn .................... F02M 59/102 74/569
2015/0152826 A1 6/2015 Dorn et al.
2015/0159610 A1* 6/2015 Dorn .................... F02M 59/102 92/129
2015/0192098 A1* 7/2015 Dorn .................... F02M 59/102 123/90.48

* cited by examiner

TAPPET

BACKGROUND

The invention concerns a tappet particularly for a pump or a compressor, said tappet comprising a tubular housing on whose drive-side annular end face two flat sections recessed from an outer shell of the housing lie diametrically opposite each other, a bolt supporting a roller being mounted in said flat sections, a separate bridge member protruding, axially below said roller, through an inner shell of the housing, an output-side end face of the bridge member serving as a contacting surface for a tappet follower part, said bridge member bearing against undersides of said flat sections in direction of the drive-side annular end face and being held in direction of an output-side annular end face of said housing by a ring which is fixed to the inner shell.

A tappet of the pre-cited type is disclosed in DE 102012211113.1. This tappet is suitable for loading a pump piston of a fuel injection pump. As can be seen in FIG. 1, the retention of the bridge member in axial direction outwards from the housing is realized through a snap ring that is held on lugs protruding radially inwards from the housing.

A drawback of the above solution is that a mounting of the bridge member over the drive-side annular end face has to be performed in a very controlled and exact manner so as to avoid any collision with the lugs. Furthermore, due to the inwards protruding components (lugs, snap ring), the radial design space in the lower region of the housing is restricted, so that under certain circumstances not enough design space is available for a resetting spring, or the like, on the output-side end face of the bridge member. In addition, the lugs weaken the housing. Depending on the case, deformation of the outer shell of the housing can occur in the region of the lugs.

SUMMARY

It is therefore an object of the invention to provide a tappet that is free of the said drawbacks. In particular, the tappet should be easy to mount and possess an enlarged design space beneath its bridge member.

The above object is achieved according to the invention in that the ring is a split spring strip and is seated in a complementary groove of the inner shell of the housing so as not to protrude, or to protrude only slightly, radially inwards out of the groove, at least two tabs projecting radially inwards from an upper side of the ring on which the bridge member is fixed in direction of the output-side annular end face.

In this way, a tappet free of the aforesaid drawbacks is created. The ring is conceived as a sheet metal or plastic ring. If necessary, a spring means spreading the ring may also be arranged in the separating gap. The design space under the bridge member, i.e. in direction of the output-side annular end face of the housing is configured such that no lugs or the like can extend any longer radially from the inner shell of the housing. However, any bevels required, are not affected by this. Thus, the bridge member can at first be relatively freely introduced into the housing (in the direction "head first mounting) till its rotational orientation relative to the contacting surface on the undersides of the flat sections becomes necessary. Important in this context however is that, due to the unrestricted design space, larger resetting springs can be installed, so that higher forces/torques become possible.

A preferred additional feature of the invention concerns a tappet that is connected to a pump piston via a spring plate. For realizing the free design space under the bridge member, the tabs of the ring advantageously extend in a complementary annular recess of an annular region of the spring plate. The latter holds the ring during operation of the tappet.

According to a further specification of the invention, the spring plate comprises through-openings that start from an outer edge thereof. These through-openings enable a good flow-through of e.g. diesel oil/lubricant, or they prevent a "pumping-up of the tappet. The through-openings may also be disposed outside of the outer edge. In addition, they help to save tappet mass.

The beam-shaped configuration of the, for example, punched bridge member proposed in a further dependent claim, permits a through-flow of e.g. diesel oil/lubricant laterally along the bridge member as well as a good handling and a simple mounting of the bridge member in mass production.

According to a further proposition of the invention, a lug protrudes from a transverse end face of the bridge member, which lug may also be made alternatively as a separate component. The lug is inserted e.g. through a punched opening of the housing, so that the tappet is endowed with an anti-rotation device of a simple structure which is secure against loss. The bridge member is thus a multifunctional component.

According to the invention, transverse end faces of the bridge member extend in osculation on the inner shell of the housing. Through this feature, mounting is facilitated and, compared to a bowstring-like configuration, edge contact is avoided.

According to a further feature of the invention, the bridge member is braced via the lugs of the ring, free of lash, within the tappet at least in axial direction. It is thus fixed against rattling.

Finally, it is also proposed to configure the bridge member as a sheet metal punched part having a relatively large thickness. This measure helps to keep the costs of production at a low level. If necessary, the bridge member may also be made by machining or by creative forming.

The proposed tappet is intended for use at least for an indirect loading of a pump piston of a fuel injection pump of a quality or quantity controlled internal combustion engine. In the same manner it would also be possible to use the tappet in a valve train of an internal combustion engine, an axial or radial piston compressor or in a similar pump.

DETAILED DESCRIPTION OF THE PREFERRED EMBODIMENTS

Figure 1:
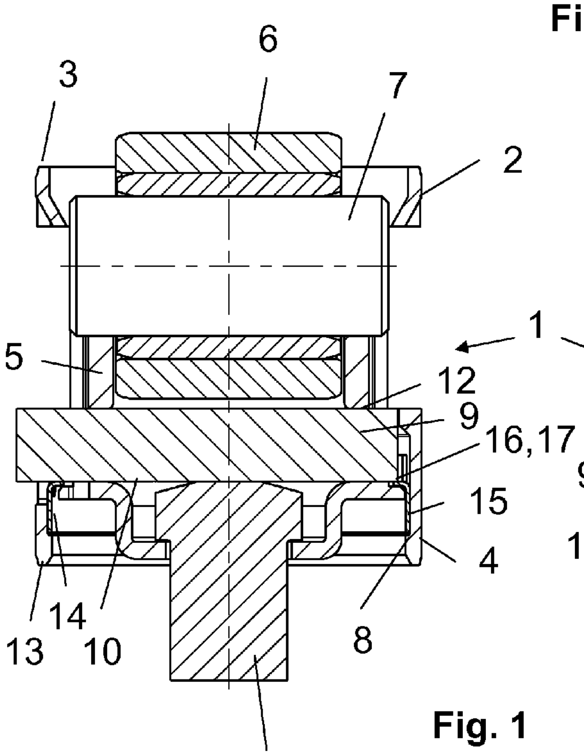
FIG. 1 shows a longitudinal section through a tappet assembly.
Figure 6:
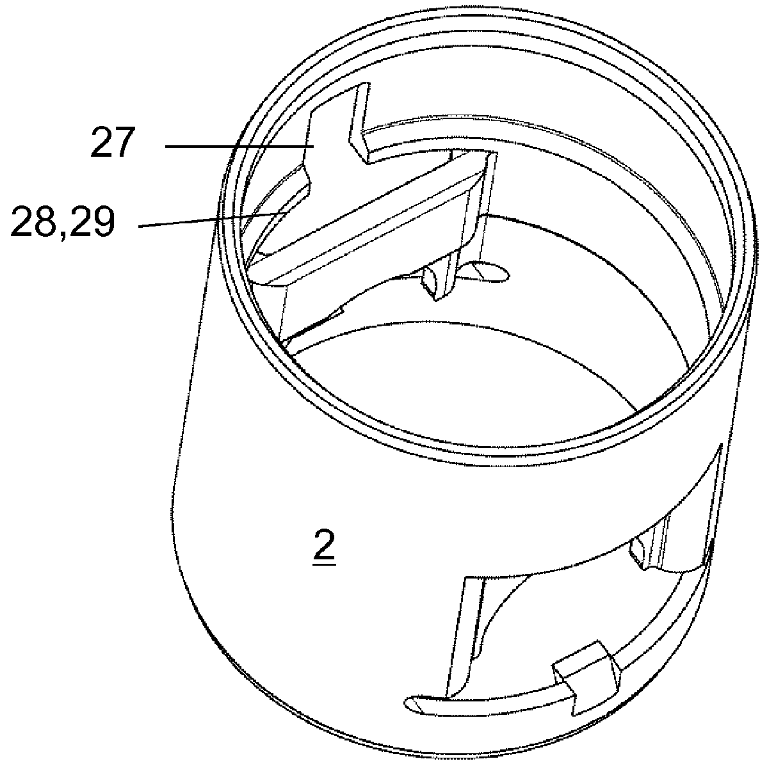
FIG. 6 shows a spatial view of the housing of the tappet seen from underneath and FIG. 7 shows the tappet of FIG. 6 in the assembled state.

The figures show a tappet 1 for a high pressure fuel pump. The tappet 1 (s. FIG. 1, 2, 6, 7) comprises a thin-walled housing 2 made out of sheet steel. Two flat sections 5 recessed from an outer shell 4 of the housing 2 lie diametrically opposite each other on a drive-side annular end face 3 of the housing 2 and can best be seen in FIG. 6. A bolt 7 supporting a roller 6 is mounted in the flat sections 5.

Figure 5:
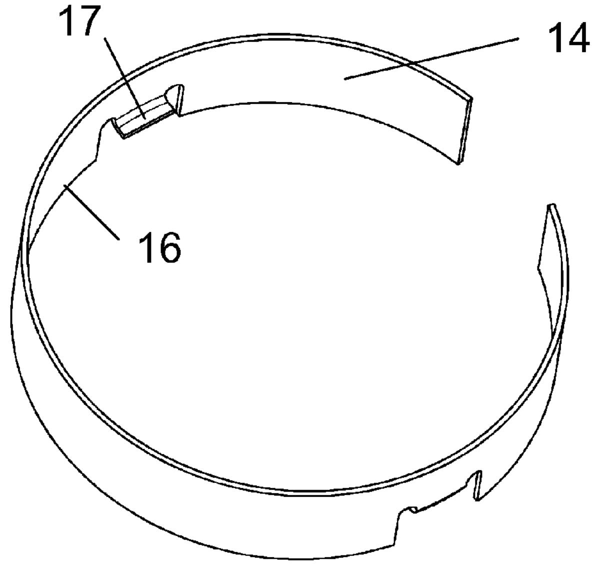
FIG. 5 shows a spatial view of the ring comprising tabs.

A separate beam-type bridge member 9 protrudes, axially below the roller 6, through an inner shell 8 of the housing 2 (s. FIG. 1, 2, 7), and a tappet follower part 11, configured as a pump piston, is in contact with an output-side end face 10 of the bridge member 9. As can be clearly seen, the bridge member 9 bears against undersides 12 of the flat sections 5 in direction of the drive-side annular end face 3 (s. FIG. 1, 7). In direction of an output-side annular end face 13 of the housing 2, a lash-free retention of the bridge member 9 is achieved through a ring 14 that is fixed to the inner shell 8, (see also FIG. 5), said ring 14 being a split spring strip. The ring 14 is seated in a circumferential groove 15 of the inner shell 8 of the housing 2 and does not protrude into the inner space of the tappet.

Two tabs 17 situated diametrically opposite each other project radially inwards from an upper side 16 of the ring 14. The bridge member 9 is fixed on these tabs 17 in direction of the output-side annular end face 3.

Figure 3:
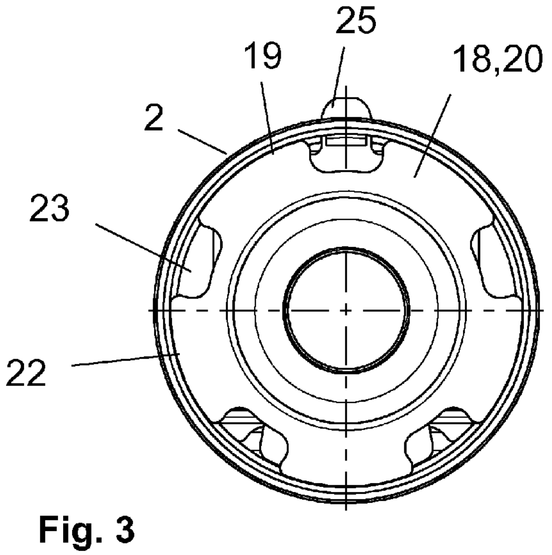
FIG. 3 shows a view corresponding to FIG. 2, but from below.
Figure 2:
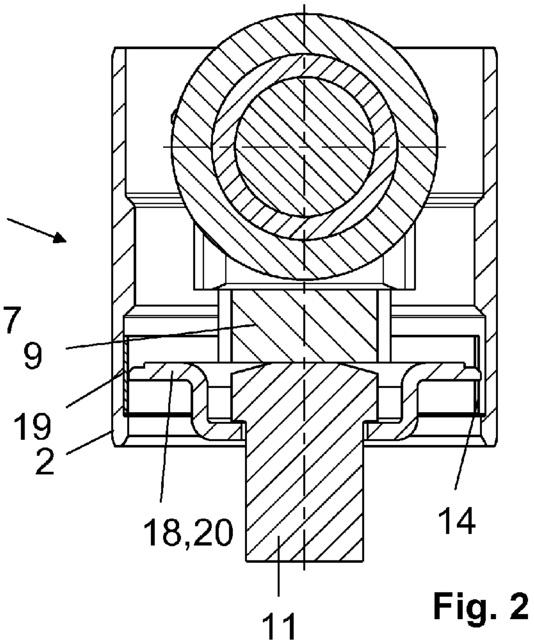
FIG. 2 shows a longitudinal section as mentioned above but turned through 90° about the about an axial line.
Figure 4:
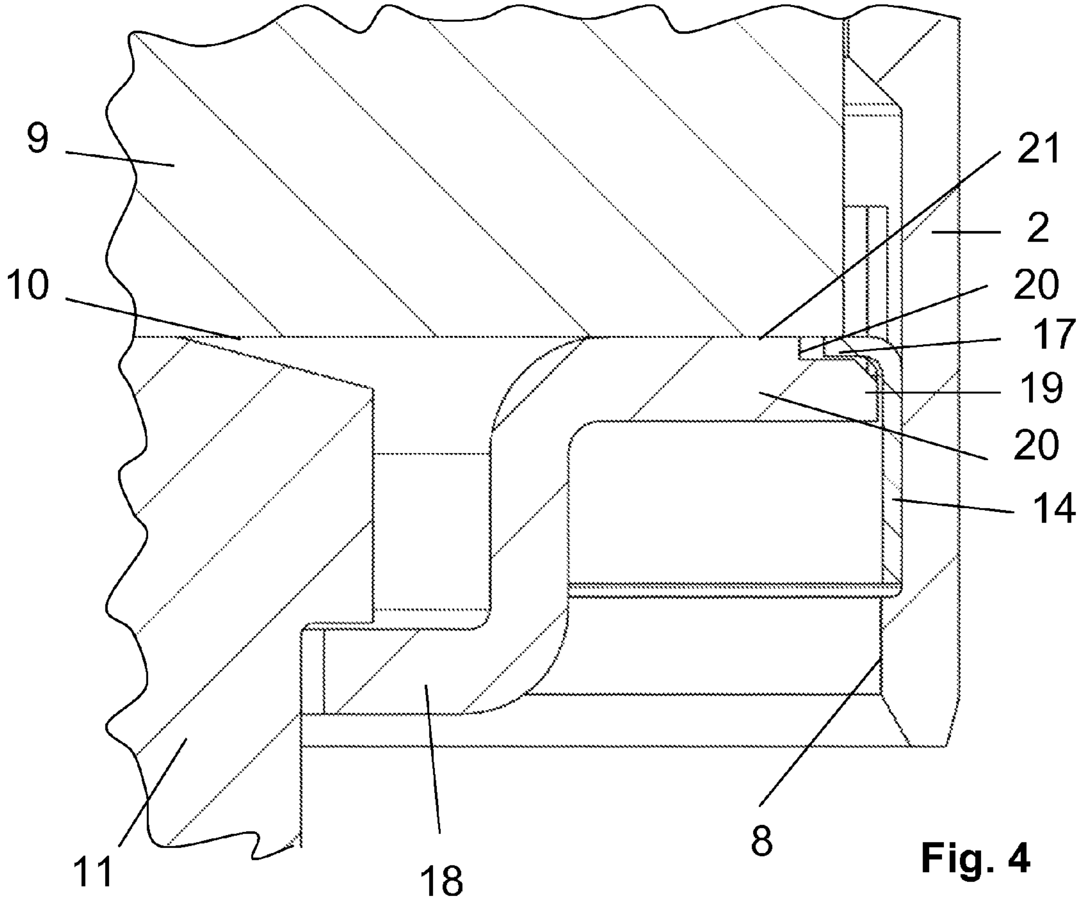
FIG. 4 shows an enlarged partial view of the assembly of FIG. 1 in the section containing the bridge member.

The pump piston 11 disclosed in FIG. 1-3 is retained on the output-side end face 10 of the bridge member 9 through a sheet metal spring plate 18 such that the pump piston 11 can execute a lateral deviation movement relative to the tappet 1. This spring plate 18 bears through an annular region 20 starting from an outer edge 19 of the spring plate 18 against the output-side end face 10 of the bridge member 9 (see also FIG. 4). The aforesaid bent tabs 17 are seated in an annular recess 20 in an upper side 21 of the annular region 20 of the spring plate 18.

FIG. 3 additionally shows that the spring plate 18 is provided with through-openings 23 that start from an outer edge 22 of the spring plate 18 for enabling a flow-through of a medium (oil, fuel).

Figure 7:
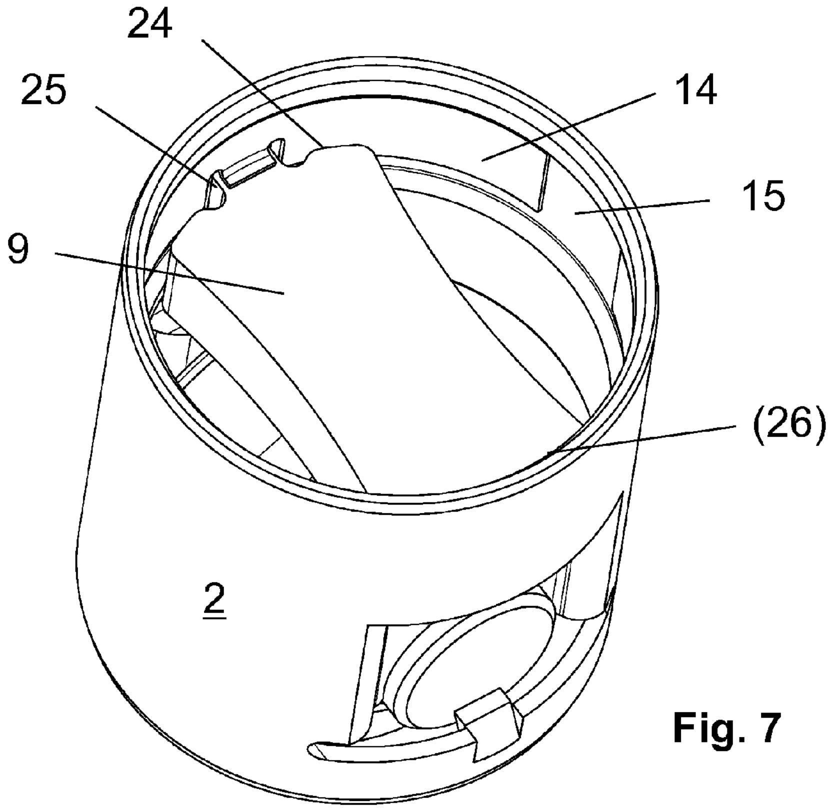

As can best be seen in FIG. 7 combined with FIG. 1, a lug 25 projects from a transverse end face 24 of the bridge member 9. This lug 25 extends through a recess 27 of the skirt of the housing 2 and serves as an anti-rotation device for the tappet 1 relative to its guide in the fuel pump. The skirt recess 27 extends from an upper crossbar 28 of a window 29 arranged in the housing 2, which window 29 is formed by one of the recessed flat sections 5 in the housing 2.

As can be seen in FIG. 7, both transverse end faces 24, 26 of the bridge member 9 are provided with a radius that is similar to a radius of the inner shell 8 of the housing 2 and said transverse end faces 24, 26 extend directly in front of the inner shell 8 of the housing 2.

LIST OF REFERENCE NUMERALS

1 Tappet
2 Housing
3 Drive-side annular end face
4 Outer shell
5 Flat section
6 Roller
7 Bolt
8 Inner shell
9 Bridge member
10 Output-side end face
11 Tappet follower part, pump piston
12 Underside
13 Output-side annular end face
14 Ring
15 Groove
16 Upper side
17 Tab
18 Spring plate
19 Outer edge
20 Annular region
21 Upper side
22 Outer edge
23 Through-opening
24 Transverse end face
25 Lug
26 Transverse end face
27 Skirt recess
28 Crossbar
29 Window

The invention claimed is:

1. A tappet for a pump or a compressor, said tappet comprising a tubular housing having a drive-side annular end face on which two flat sections are located recessed from an outer shell of the housing that lie diametrically opposite each other, a bolt supporting a roller being mounted in said flat sections, a separate bridge member protruding, axially below said roller, through an inner shell of the housing, an output-side end face of the bridge member serving as a contacting surface for a tappet follower part, said bridge member bearing against undersides of said flat sections in a direction of the drive-side annular end face and being held in a direction of an output-side annular end face of said housing by a ring which is arranged in the inner shell, the ring is formed of a split spring strip and is seated in a groove of the inner shell of the housing so as not to protrude radially inwards out of the groove, at least two tabs projecting radially inwards from an upper side of the ring on which the bridge member is fixed in the direction of the output-side annular end face.

2. The tappet of claim 1, wherein the tappet follower part is held on the output-side end face of the bridge member through a spring plate, the spring plate bearing against the output-side end face of the bridge member through an annular region that starts from a first outer edge of the spring plate, and the tabs are seated in pockets or in an annular recess in an upper side of the annular region of the spring plate.

3. The tappet of claim 2, wherein the bridge member is made as a sheet metal punched part.

4. The tappet of claim 2, wherein the spring plate is provided with through-openings that start from a second outer edge of the spring plate, for enabling a flow-through of a medium.

5. The tappet of claim 1, wherein the bridge member is retained through the ring in the housing without axial lash.

6. The tappet of claim 1, wherein the bridge member is configured as a beam having one transverse end face that protrudes with a lug through the housing for forming an anti-rotation device for the tappet.

7. The tappet of claim 6, wherein the lug extends integrally from the bridge member, a skirt recess that is required for the lug starts from an upper crossbar of a window in the housing, said window being formed by one of the recessed flat sections in the housing.

8. The tappet of claim 6, wherein with exception of the groove for the ring, the inner shell of the housing is free of steps or projections below the beam.

* * * * *